United States Patent
Gill et al.

(10) Patent No.: US 12,158,685 B2
(45) Date of Patent: Dec. 3, 2024

(54) RF DELAY LINE FOR SEGMENTED OPTICAL WAVEGUIDE MODULATOR

(71) Applicant: NOKIA SOLUTIONS AND NETWORKS OY, Espoo (FI)

(72) Inventors: Douglas Gill, South Orange, NJ (US); Juthika Basak, San Jose, CA (US); Asres Seyoum, Franklin Park, NJ (US); Matthew Streshinsky, Taos, NM (US)

(73) Assignee: Nokia Solutions and Networks Oy, Espoo (FI)

( * ) Notice: Subject to any disclaimer, the term of this patent is extended or adjusted under 35 U.S.C. 154(b) by 312 days.

(21) Appl. No.: 17/560,809

(22) Filed: Dec. 23, 2021

(65) Prior Publication Data

US 2023/0205042 A1 Jun. 29, 2023

(51) Int. Cl.
*G02F 1/225* (2006.01)
*G02F 1/035* (2006.01)

(52) U.S. Cl.
CPC .......... *G02F 1/2255* (2013.01); *G02F 1/0356* (2013.01); *G02F 2201/127* (2013.01)

(58) Field of Classification Search
CPC .... G02F 1/2255; G02F 1/2257; G02F 1/0356; G02F 1/212; G02F 2201/127; G02F 2201/12; G02F 2201/126
USPC ........................................................ 385/1–3
See application file for complete search history.

(56) References Cited

U.S. PATENT DOCUMENTS

| | | | |
|---|---|---|---|
| 9,519,162 B2 | 12/2016 | Ding et al. | |
| 9,559,779 B2 | 1/2017 | Ding et al. | |
| 9,874,767 B2 | 1/2018 | Ding et al. | |
| 10,168,596 B2 | 1/2019 | Williams et al. | |
| 10,451,903 B2 | 10/2019 | Ding et al. | |
| 10,466,567 B1 | 11/2019 | Vera Villarroel et al. | |
| 10,656,441 B2 | 5/2020 | Ding et al. | |
| 11,209,674 B2 | 12/2021 | Ding et al. | |
| 11,740,533 B2 * | 8/2023 | Poulin | G02F 1/2255 385/2 |
| 2008/0069491 A1 | 3/2008 | Kissa et al. | |
| 2011/0044573 A1 | 2/2011 | Webster et al. | |
| 2014/0061450 A1 * | 3/2014 | Gill | G02F 1/0356 250/227.11 |
| 2016/0363834 A1 | 12/2016 | Velthaus et al. | |
| 2017/0194310 A1 | 7/2017 | Evans et al. | |
| 2018/0341164 A1 | 11/2018 | Williams et al. | |
| 2021/0135761 A1 | 5/2021 | Tanaka et al. | |

OTHER PUBLICATIONS

European Search Report from corresponding EP patent application No. 22213366, mailed Apr. 19, 2023.

(Continued)

*Primary Examiner* — Robert Tavlykaev
(74) *Attorney, Agent, or Firm* — Stratford Group Ltd.

(57) ABSTRACT

A segmented optical modulator includes two optical modulator segments located along a main face of a photonic chip, and two RF transmission lines connected to drive a corresponding one of the two optical modulator segments. A signal electrode of one of the transmission lines includes a segment that is vertically capacitively coupled to a plurality of spaced ground-connected metallic elements disposed in sequence along a length of the segment above or below thereof so as to be capacitively coupled thereto.

18 Claims, 13 Drawing Sheets

(56) References Cited

OTHER PUBLICATIONS

Examiner Report from corresponding, unpublished U.S. Appl. No. 17/561,071, mailed May 9, 2023.
Unpublished European Patent Application No. 21169364.3, filed Apr. 20, 2021 by applicant Nokia Solutions and Networks Oy.
Unpublished U.S. Appl. No. 17/561,071, filed Dec. 23, 2021 by applicant Nokia Solutions and Networks Oy.
Office Action issued Nov. 24, 2023, for related U. S. U.S. Appl. No. 17/561,071.

* cited by examiner

ID FIELD

The present invention generally relates to optical modulators, and more particularly relates to an optical waveguide modulator with segmented electrodes.

BACKGROUND

Broad-band optical communications typically require high-speed electro-optical modulators (EOM) to modulate light at a desired data rate. One common type of a broad-band EOM is a Mach-Zehnder modulator (MZM), which uses an optical waveguide structure forming an Mach-Zehnder interferometer (MZI), with RF-driven optical phase modulators in each waveguide arm. The optical waveguide arms of the MZM are typically formed in a suitable semiconductor or other electro-optic material such as LiNbO$_3$, so that light propagation in the waveguide arms may be controlled by applying a voltage there across. Such an optical waveguide modulator may be implemented in an optoelectronic chip as a photonic integrated circuit (PIC).

A silicon photonics (SiP) platform, e.g., based on a Silicon-on-Insulator (SOI) technology, may be particularly attractive for implementing broad-band EOMs, which can, e.g., enable a natural integration with CMOS-based high-speed electronic drivers. In the SiP platform, voltage-controlled optical phase modulators may be formed by incorporating p/n junctions into optical waveguides, such as an optical waveguide arm of an MZM. An electrode extending along a length of the optical waveguide arm in an electrical contact with the p/n junction may be used to either inject electrical charge carriers (forward bias) or deplete carriers (reverse bias) in the optical waveguide core, thereby modulating the effective refractive index of the optical waveguide, and the phase of light propagating therethrough.

At modulation rates in the range of tens of gigabits per second (Gb/s) and higher, electrical transmission lines formed with properly terminated travelling-wave (TW) electrodes are typically used to carry RF electrical drive signals for controlling optical phase modulators in such optical waveguides. However, the RF signal loss in the electrical transmission line, velocity mismatch between the optical and electrical waves, as well as increasing optical loss, limit the total optical phase shift that may be achieved by increasing the modulator length. Some optical modulators have a series of optical modulator segments.

SUMMARY

In various embodiments, an optical modulator has a series of optically connected optical modulator segments, and each such optical modulator segment is driven by a separate RF driver output stage or an electronic driver. The series of optical modulator segments can be operated to produce a total phase shift proportional to the length of the series if the electrical RF driver signals from the separate RF driver outputs and the optical signal are approximately temporally synchronized in individual ones of the optical modulator segments. Herein, some embodiments may provide such approximate synchronization by relatively delaying different ones of the electrical RF driver signals via propagation through corresponding RF transmission lines of a parallel array thereof.

Some embodiments may implement a bandwidth/drive-voltage tradeoff in a TW EOM by incorporating multiple TW modulation segments along an individual optical waveguide of a EOM device. By combining the modulation response of multiple TW modulation segments in a cumulative way, e.g., a relatively low drive voltage can be used.

An aspect of the present disclosure relates to an apparatus comprising a photonic chip having a planar main face and comprising a segmented optical modulator having a plurality of optical waveguide modulation segments, the optical waveguide modulation segments being located along the main face and being optically connected in series. The apparatus further comprises a vertical stack, at least, including: a first layer comprising a plurality of metallic radio frequency (RF) transmission lines therein, each metallic RF transmission line being electrically connected to drive a corresponding one of the optical waveguide modulation segments, and a second layer extending along and separate from the first layer and comprising separate metallic structures therein, the metallic structures being capacitively coupled to adjacent segments of one or more of the metallic RF transmission lines; and an electrical insulating layer located between the first and second layers.

In some implementations, each of the metallic RF transmission lines may comprise a signal electrode and at least one ground electrode; wherein some of the metallic structures face one of the RF transmission lines and are capacitively coupled to an adjacent segment of the signal electrode thereof and connected by metallic connectors to the at least one ground electrode thereof. In any of such implementations, the some of the metallic structures capacitively coupled to an adjacent segment of the signal electrode may comprise first metallic segments aligned along the segment of the signal electrode. In any of the implementations including the metallic connectors, the metallic connectors may each comprise a metallic segment extending transverse to the adjacent segment of the signal electrode and be physically connected by a metal portion traversing the electrical insulating layer to the at least one ground electrode of the one of the RF transmission lines.

In any of the above implementations, the metallic structures may have linear dimensions less than or equal to one quarter of a wavelength of an RF signal propagating along one of the RF transmission lines with a frequency of a baud rate of the RF driver circuit.

In any of the above implementations, the metallic structures may have a length along the adjacent segment of the signal electrode that is smaller than one quarter of a wavelength of an RF signal propagating along one of the RF transmission lines and having a frequency of a baud rate of the RF driver circuit.

In any of the above implementations wherein the RF transmission lines each comprise a signal electrode, some of the metallic structures may have segments of a first width along the adjacent segment of the signal electrode of the one of the RF transmission lines and others of the metallic structures have segments of a different second width along an adjacent segment of a signal electrode of another of the RF transmission lines.

In any of the above implementations, the second layer may be between the main face and the first layer.

In any of the above implementations, the vertical stack may be in the photonic chip, or flip-chip mounted to the photonic chip, or in a carrier external to the photonic chip. In some implementations, the carrier may be flip-chip mounted to the photonic chip.

In any of the above implementations, the photonic chip may comprise an optical waveguide extending along the main face, and the RF transmission lines may comprise segments extending adjacent and along corresponding segments of the optical waveguide to form the optical waveguide modulator segments therewith. In some implementations, the optical waveguide may be an optical waveguide arm of a Mach-Zehnder modulator located along the main face.

In any of the above implementations, the optical modulator may comprise an optical resonator including a segmented Mach-Zehnder modulator comprising the optical waveguide modulation segments.

In any of the above implementations, at least one of the RF transmission lines may comprise two ground electrodes and two signal electrodes extending between the two ground electrodes, wherein some of the metallic structures form sequences along adjacent segments of the signal electrodes and are electrically connected by metal connectors to at least one of the ground electrodes.

Any of the above implementations may include an RF driver circuit having an array of parallel RF outputs, each of the RF outputs being electrically connected to a corresponding one of the metallic RF transmission lines. A first of the metallic RF transmission lines may be, in at least some implementations, configured to cause a first delay for an RF signal to propagate therethrough and a second of the metallic RF transmission lines may be configured to cause a different delay for an RF signal to propagate therethrough.

A related aspect of the present disclosure provides a segmented optical modulator comprising: a photonic chip having a planar main face and comprising an optical waveguide modulator including two optical modulator segments located along the main face and optically connected in series; first and second radio frequency (RF) transmission lines therein, each comprising at least one signal electrode and being connected to drive a corresponding one of the two optical modulator segments; and a vertical stack, the vertical stack at least, comprising: a first layer comprising at least a segment of the at least one signal electrode of the second RF transmission line; a second layer extending along the first layer and comprising a metallic structure adjacent to the at least a segment of the at least one signal electrode and capacitively coupled thereto; and an insulating layer located between the first and second layers.

A related aspect of the present disclosure provides a segmented optical modulator comprising: a photonic chip having a planar main face and comprising an optical modulator including two optical waveguide modulation segments located along the main face and optically connected in series; first and second radio frequency (RF) transmission lines, each of the transmission lines comprising a signal electrode and being connected to drive a corresponding one of the two optical waveguide modulation segments; and a plurality of spaced apart and ground-connected metallic elements being disposed in sequence along a segment of the second RF transmission line, being capacitively coupled thereto and being at a different vertical distance from the planar main face than the second RF transmission line.

BRIEF DESCRIPTION OF THE DRAWINGS

Embodiments disclosed herein will be described in greater detail with reference to the accompanying drawings which represent example embodiments thereof, which are not to scale, in which like elements are indicated with like reference numerals, and wherein.

DETAILED DESCRIPTION

Figure 1:
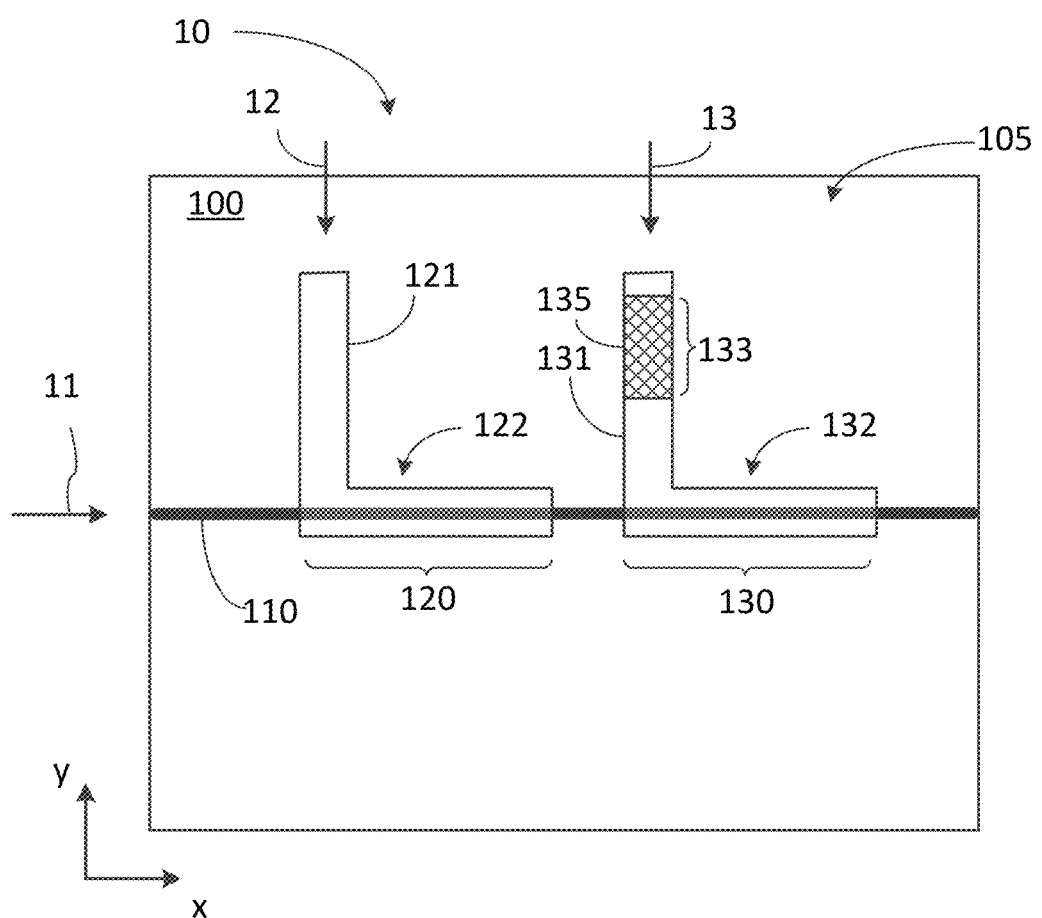
FIG. 1 is a schematic top view of a portion of a photonic chip with a segmented optical waveguide modulator having an on-chip RF delay line formed using distributed capacitive loading of a segment of an RF transmission line (TL)

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future.

Furthermore, the following abbreviations and acronyms may be used in the present document:
"CMOS" Complementary Metal-Oxide-Semiconductor
"GaAs" Gallium Arsenide
"InP" Indium Phosphide
"Si" Silicon
"SiO2" Silicon Dioxide
"LiNbO3" Lithium Niobate
"PIC" Photonic Integrated Circuit
"SOI" Silicon on Insulator
"SiP" Silicon Photonics
"RF" Radio Frequency
"DC" Direct Current
"AC" Alternate Current
"TW" Travelling Wave
"G-S-G" Ground-Signal-Ground
"G-S-S-G" Ground-Signal-Signal-Ground Note that as used herein, the terms "first", "second" and so forth are not intended to imply sequential ordering, but rather are intended to distinguish one element from another, unless explicitly stated. Similarly, sequential ordering of method steps does not imply a requirement of sequential order of their execution, unless explicitly stated. The term "connected" may encompass direct connections or indirect connections through intermediate elements, unless explicitly stated otherwise. The term "electrically connected" and its derivatives refers to DC connections unless explicitly stated otherwise. Herein, the term p/n junction encompasses both strict p/n junctions having only contacting p-doped and n-doped regions and p/i/n junctions having a region of substantially intrinsic conductivity located between the p-doped and n-doped regions. The term "differential signal" refers to a signal that is transmitted using two single-ended signals having about complementary AC components. The term "substrate" encompasses single and multi-layer structures. The term "RF" (Radio Frequency) refers to frequencies in a range from megahertz (MHz) to about one terahertz (THz). The term "high-speed RF signals" refer to RF signals at frequencies above 10 gigahertz (GHz).

A traveling wave (TW) electrode supports propagation of an RF operating signal there along. Typical TW electrodes usually are longer than about $1/10^{th}$ of a smallest operating wavelength for an RF signal propagating along the electrode. TW electrodes are often electrically terminated to, at least, partially suppress back reflections of the RF signal at their ends, or even to totally suppress such back reflections. For example, such an electrical termination may be a matched electrical connection to a chip ground or a DC source.

The present disclosure describes examples of segmented electro-optic modulators (EOMs) using travelling-wave RF transmission lines (TLs) to individually drive different optical modulator segments (OMSs) of the segmented EOMs, with RF TLs having vertically-loaded TL segments to implement one or more RF delay lines, said vertically loaded TL segments being vertically capacitively coupled to distributed metallic loading structures.

FIG. 1 schematically illustrates a portion of a photonic chip 100 of a segmented EOM 10 according to an example embodiment. The illustrated portion includes an optical waveguide 110, and two RF TLs 121 and 131, all being disposed along a main face 105 of the photonic chip 100.

The RF TLs 121 and 131 include modulating segments 122 and 132, respectively, which extend along corresponding segments of the optical waveguide 110 and electro-optically cooperate therewith to form two optical modulator segments (OMSs) 120, 130 connected optically in series. The second of the two RF TLs, RF TL 131, includes an RF delay line segment 135 upstream of the modulating segment 132 thereof. The RF TLs 121 and 131 each typically include at least one signal electrode, which extends along a corresponding segment of the optical waveguide, and at least one ground electrode extending along the signal electrode with the optical waveguide therebetween.

In operation, input light 11 propagating in the optical waveguide 110 passes the modulator segments 120 and 130 sequentially, reaching the second modulator segment 130 with a time delay τ relative to the first modulator segment 120. The time delay τ may be referred to as the optical time delay. The RF TLs 121 and 131 deliver RF driving signals 12 and 13 to the modulator segments 120, 130 to modulate the light as the light propagates through the corresponding modulator segments. The RF driving signals 12 and 13 carry a same data signal, and the RF delay line segment 135 is preferably configured so that the light propagation through the modulator segments 120, 130 is about time-synchronized with the delivery of corresponding portions of the RF driving signals 12, 13 to the respective modulator segments.

The RF delay line segment 135 may be formed using distributed capacitive loading structures that are vertically capacitively coupled to an adjacent TL segment 133 of the corresponding RF TL 131 so as to slow down the propagation of the RF driving signal 13 relative to a similar segment of the RF TL 131, which does not have or alternatively, has different capacitive loading structure (not shown). The length of the capacitively-loaded TL segment 133 and/or the amount of capacitive loading may be configured to provide a desired relative delay, e.g. to match the difference in propagation times of corresponding portions of an RF signal from a common RF driver stage (e.g. 511 in FIGS. 5A and 5B) to RF inputs of the modulator segments 120, 130 to the relative optical delay τ, i.e. the time it takes light 11 to propagate from the input end of the first modulator segment 120 to the input end of the second modulator segment 130.

Figure 2A:
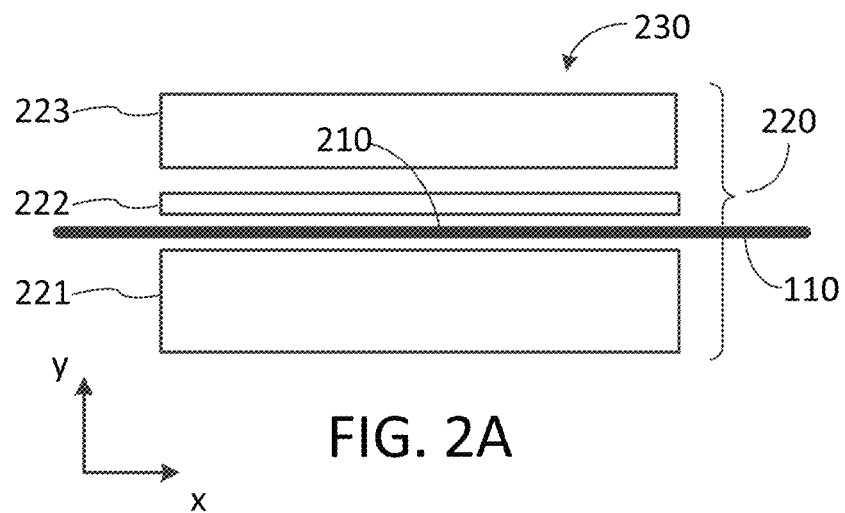
FIG. 2A is a schematic top view of a modulating segment of an example G-S-G RF TL of a segmented optical waveguide modulator according to an embodiment.

Example embodiments of the RF delay line segment 135 will now be described with reference to FIGS. 2A-2C. FIG. 2A illustrates an example modulation segment of an RF TL 230, which may embody either one of the RF TLs 121, 131 schematically shown in FIG. 1. In the illustrated embodiment the RF TL 230 is a three-electrode ground-signal-ground (G-S-G) transmission line, with a signal electrode 222 extending between two ground electrodes 221 and 223. Embodiments in which the second ground electrode 223 is absent, and wherein the RF TL is a two-electrode ground-signal (G-S) TL, are also within the scope of the present disclosure. In the modulating TL segment, the signal electrode 222 extends along a segment 210 of the optical waveguide 110, with a first ground electrode 221 extending therealong on the other side of the optical waveguide 110. The signal electrode 222 may also be referred to as the first signal electrode. An RF signal propagating in the RF TL 230 modulates a voltage across the optical waveguide 110, changing the optical properties thereof and thereby modulating light propagating in the optical waveguide. The second ground electrode 223 may be provided along the other side of the signal electrode 222 for symmetry, and/or for EM shielding. By way of example, the optical waveguide 110 may be formed with a semiconductor material, e.g. silicon, and include a p/n junction that may be suitably biased, e.g.

to operate in a depletion mode. In other embodiments, the optical waveguide 110 may be formed with an electro-optic active material, such as but not exclusively LiNbO3.

Figure 2B:
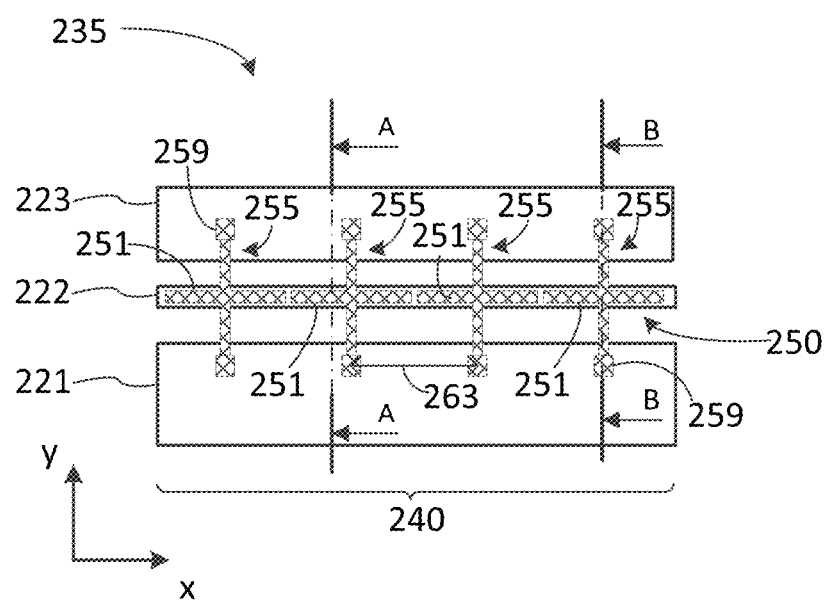
FIG. 2B is a schematic top view of an RF delay line formed with a capacitively-loaded segment of the RF TL of FIG. 2A according to an embodiment.
Figure 2C:
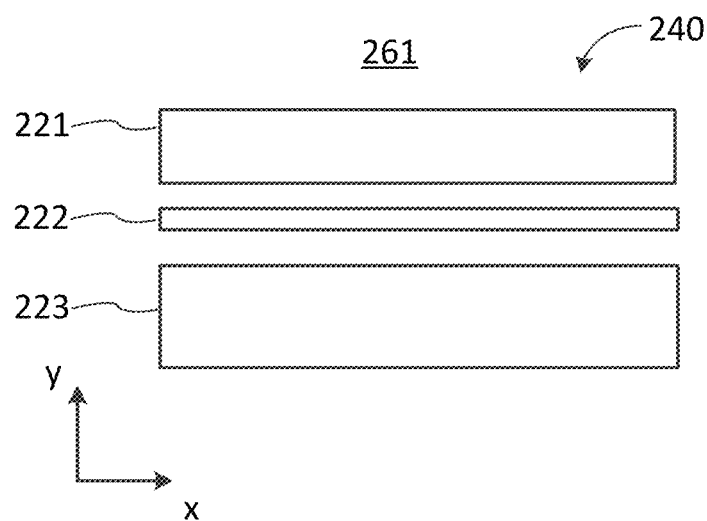
FIG. 2C is a schematic top view of the TL segment of FIG. 2B in a first layer of a vertical layer stack.

FIG. 2B illustrates an example RF delay line segment 235, which may implement the RF delay line segment 135 of FIG. 1 in embodiments with G-S-G TLs. The RF delay line segment 235 includes a segment 240 of the RF TL 230 that is vertically capacitively coupled to a distributed metallic structure 250, also shown separately in FIG. 2D. Here the term "vertical" refers to a direction that is perpendicular to a main face of a chip or substrate along which the corresponding RF TL extends. The metallic structure 250 is configured to provide a distributed capacitive loading to the TL segment 240. The RF delay line segment 235 may be embodied with a vertical layer stack, having the TL segment 240 disposed in a first layer 261 of the stack (FIG. 2C). The metallic structure 250 includes a plurality of spaced metallic elements 251, which are spread along a length of the signal electrode 222, e.g. in a vertical alignment therewith, and are capacitively coupled to adjacent segments of the signal electrode 222. The spaced metallic elements 251 may be disposed in a second layer 262 (FIG. 2D) of the stack, which extends along the first layer 261 and is vertically spaced therefrom. The metallic structure 250 further includes a plurality of metal connectors 255 electrically connecting each of the spaced metallic elements 251 to at least one of the ground electrodes 221 and 223.

The spaced metallic elements 251 may be e.g. in the form of metallic strips, i.e. separate segments of a metallic line, which may be sequentially spread along a length of the first signal electrode 222, e.g., aligned therealong, and separated from each other by gaps to be electrically insulated from each other. In a typical embodiment the spaced metallic elements 251 are positioned vertically over or under the signal electrode 222 with an electrical insulator layer therebetween.

Figure 2D:
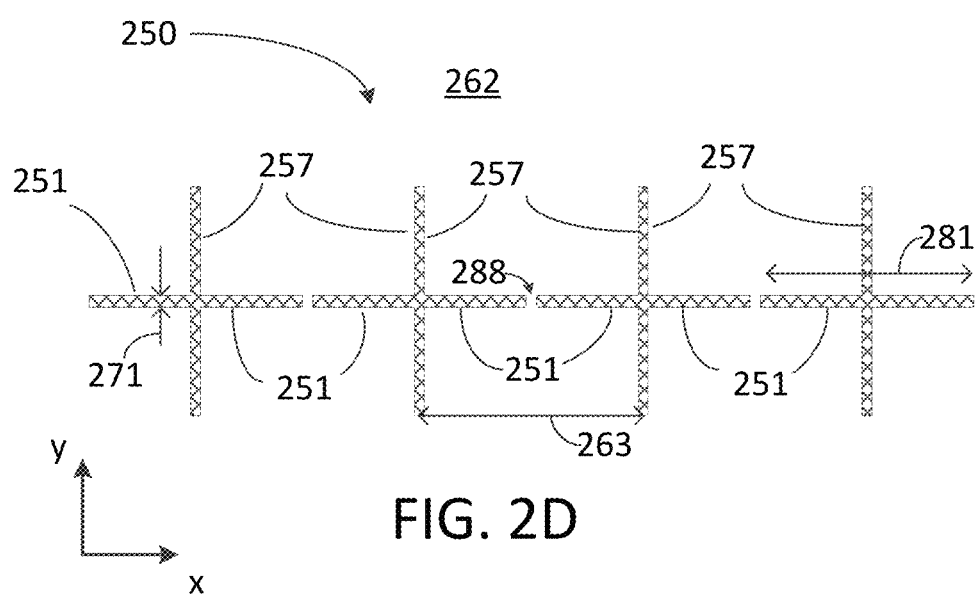
FIG. 2D is a schematic top view of the distributed metallic structure in a second layer of the vertical layer stack above or below the TL segment of FIG. 2C.
Figure 3A:
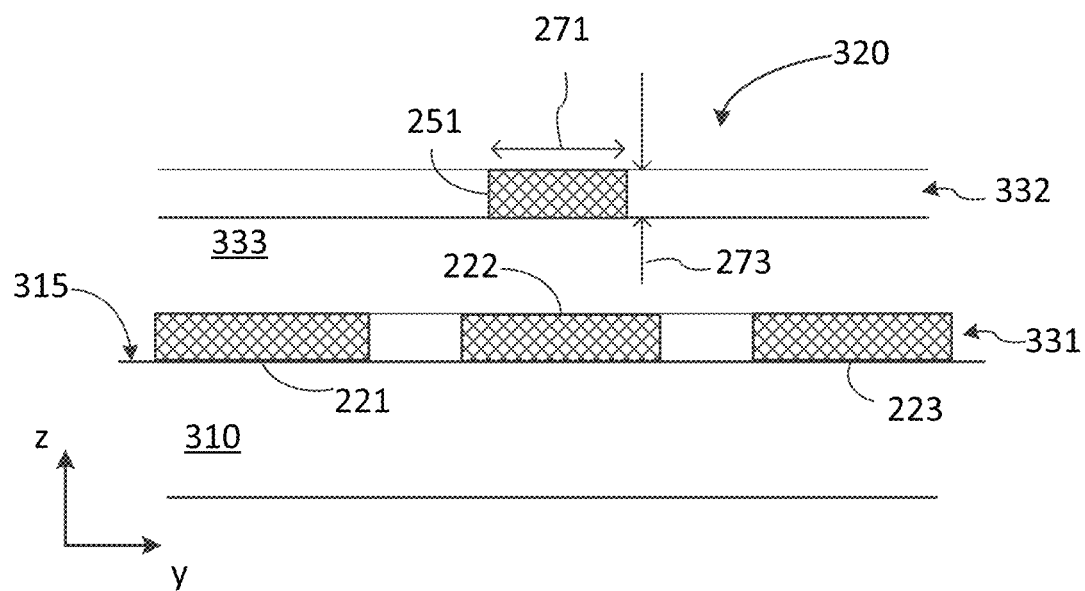
FIG. 3A is a schematic first partial cross-section of the example RF delay line of FIG. 2B along the A-A line.
Figure 3B:
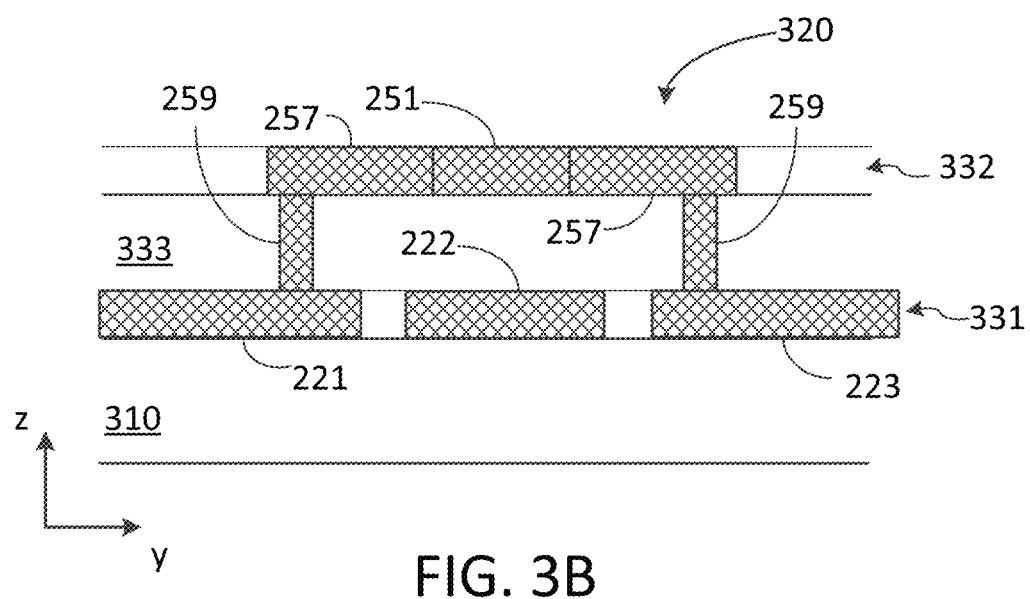
FIG. 3B is a schematic second partial cross-section of the example RF delay line of FIG. 2B along the B-B line.

FIGS. 3A and 3B illustrate an example vertical stack 320 implementing the RF delay line segment 235. FIG. 3A shows a first cross-section of the vertical stack, which may represent the cross-section of the RF delay line 235 along a line A-A shown in FIG. 2B. FIG. 3B shows a second cross-section of the vertical stack, which may represent the cross-section of the RF delay line 235 along a line B-B shown in FIG. 2B. The vertical stack 320 includes, at least, three layers 331, 332, and 333 that are vertically stacked one over the other, with layers 331 and 332 including the first and second metallic layers 261, 262 described above with reference to FIGS. 2C and 2D. The vertical stack 320 is disposed over a planar surface 315 of a substrate 310, which may include one or more other layers. Here, "vertical" refers to a direction generally perpendicular to the planar surface 315 of the substrate. The first layer 331 includes the metallic signal electrode 222 and the metallic ground electrodes 221, 223 of the RF TL 230. The second layer 332 includes the metallic elements 251, each being disposed over a corresponding segment of the signal electrode 222 and being capacitively coupled thereto. An electrical insulator layer 333 separates the metallic elements 251 from the signal electrode 222. In embodiments using a SiP platform, the insulator layer 333 may be, for example, a layer of silicon dioxide (SiO2), silicon nitride (Si3N4), or another suitable dielectric, and may have a thickness in a range from 0.05 to 25 microns (μm), by way of example. Each metallic element 251 and the adjacent segment of the signal electrode 222 cooperate, by means of electro-magnetic coupling (EM), to form a lumped capacitor, with the metallic element 251 being one plate of the lumped capacitor and a facing segment of the signal electrode 222 functioning as the other plate of the lumped capacitor. In some embodiments, the sequence of metallic elements 251 may be periodically spaced to produce a periodic or nearly-periodic sequence of lumped-element capacitors. Embodiments in which the metallic elements 251 are spaced aperiodically are also within the scope of the present disclosure.

The metallic elements 251 may be electrically tied to a ground plane, e.g. electrically connected to at least one of the ground electrodes 221, 223 of the RF TL 230. In the illustrated embodiment, the ground connections are provided by transverse metallic segments 257 and metal filled vias 259, also referred to herein as "ground ties". The transverse metallic segments 257 extend in the second layer 332 from the metallic element 251 facing the RF TL, i.e. across the gaps between the signal and ground electrodes thereof, and connect electrically and physically to metal filled vias 259, which pass through the electrical insulator layer 333 and in turn, electrically and physically connect to at least one of the ground electrodes 221 and 223, as illustrated in FIG. 3B for an example embodiment. The metallic elements 251 may be made wider or narrower to control the amount of capacitance added to the underlying TL segment 240.

Referring also back to FIGS. 2B and 2D, the sequence of metallic elements 251 is configured so that the metallic structure 250 formed therewith provides distributed capacitive loading to the facing TL segment 240, thereby slowing down RF signals propagating therein. For a given overall length of the metallic structure 250 along the RF TL, the amount of capacitive loading may be adjusted by varying the width 271 of the metallic elements 251. The spacing p 263 between the ground ties 259, and/or the length l 281 of each metallic element 251 along the signal electrode 222 may be made sufficiently small relative to a relevant RF wavelength $\lambda_m$, so that the distributed metallic structure 250 does not substantially affect, or at most weakly affects, the impedance of the RF delay line formed therewith. By way of example, in some embodiments the length l 281 of each metallic element 251 may be less than $\lambda_m/4$, or even no greater than $\lambda_m/10$. In some embodiments the spacing p 263 between the ground ties may be less than $\lambda_m/4$, or no greater than $\lambda_m/10$. Here, the relevant RF wavelength $\lambda_m$ may be the wavelength of an RF signal of a frequency $f_m$ propagating in the capacitively loaded RF TL segment, wherein $f_m$ is a frequency at an upper edge of a target frequency bandwidth for the data signal being transmitted, e.g. the 3 dB frequency bandwidth thereof, $f_m=f_{3\,Db}$. The frequency $f_m$ is related to a baud, or symbol, rate $R_{bd}$ of the optical modulator, and may also depend, e.g., on the data transmission format, and digital processing at the receiver. By way of example, for a binary NRZ (non-return-to zero) direct detect modulation format $f_m$ may be about 75% of the bit rate of the data signal, for a PAM4 modulation format $f_m$ may be about 80% of the baud rate, and about 50% of the baud rate for DPSK. Accordingly, in various example embodiments, the length l 281 of each metallic element 251, and/or the spacing p 263 between the ground ties, may be no more than about $\lambda_{BD}/3$, or no more than about $\lambda_{BD}/4$, or no more than about $\lambda_{BD}/8$, wherein $\lambda_{BD}$ is the wavelength of an RF signal of a frequency $f=R_{bd}$ propagating in the capacitively loaded RF TL segment.

The relevant RF wavelength $\lambda_m$ depends on the propagation speed of the RF signal in the capacitively loaded (or slow-wave) TL, which can vary by as much as a factor of 5, corresponding to an effective RF propagation constants ranging e.g. from about 2 to about 10. By way of example, for an optical modulator configured for NRZ modulation and implemented in a silicon photonics (SiP) chip with an RF delay line having an RF propagation constant of about 5 to operate at a baud or symbol rate of 100 Gbaud, $\lambda_m$ may correspond to about 800 μm, and the element length l, and/or the ground tie spacing p, may be less than about 200 μm, or no greater than 80 μm in some embodiments; for NRZ and PAM4 optical modulators, the above cited example length values scale approximately in proportion to a ratio k=(100/$R_{bd}$) for other baud rates $R_{bd}$ expressed in Gbaud, and the same RF propagation constant in the delay line segment. The gaps 288 separating adjacent metallic elements 251 may be, for example, in a range from 1 to 80 μm. The length of the capacitive structure 250 along the RF TL 240, e.g., the length of segment 135 of FIG. 1, depends on the desired relative delay values between the RF driver signal input to the optical modulation segments 120 and 130 of FIG. 1. In some embodiments, the total length of the distributed metallic structure 250 along the signal electrode may be, for example, in a range from about 500 μm to 10,000 μm. The number of consecutive metallic elements 251 in the distributed metallic structure 250 may be, for example, in a range from 2 to 50 or more.

With the suitably short metallic elements 251, the presence of the distributed metallic structure 250 may contribute relatively weakly to the impedance Z(f) of the RF delay line segment 235 formed therewith. The impedance Z(f) of the RF delay line segment 235 can then be controlled somewhat independently via a modification of the delay line inductance and capacitive loading, e.g. by varying the electrode geometry of the underlying RF TL 230, e.g. the width or thickness of the signal electrode 222 and/or its distance from the ground electrodes 221, 223. Since the amount of capacitive and inductive loading is related to the propagation speed of the electrical RF signal in the RF TL, the delay time imparted by the RF delay line segment 235 upon the RF signal propagating therethrough can be changed by modifying its cross-sectional geometry while maintaining the same length of the RF TL. For example, we estimate that in some embodiments the RF propagation constant in the RF delay line 235 can be varied by a factor of about 5, e.g. between values of about 2 and 10 by changing the amount of capacitive loading imparted by the metallic loading structure 250 and the overall inductance of the RF delay line. We note that the capacitive loading structures may have a relatively modest impact on the TL inductance, whereas the TL line electrode width and thickness may have a bigger impact on inductance than on capacitance, which may simplify achieving a desired TL design point. Accordingly, the propagation speed of RF signals in the RF delay line segment 235 and the impedance of the RF delay line segment 235 may be substantially independently controlled, which may be advantageous for configuring the optical waveguide modulator to a particular environment, e.g. when designed for an environment of 50 Ohms or otherwise.

Figure 4:
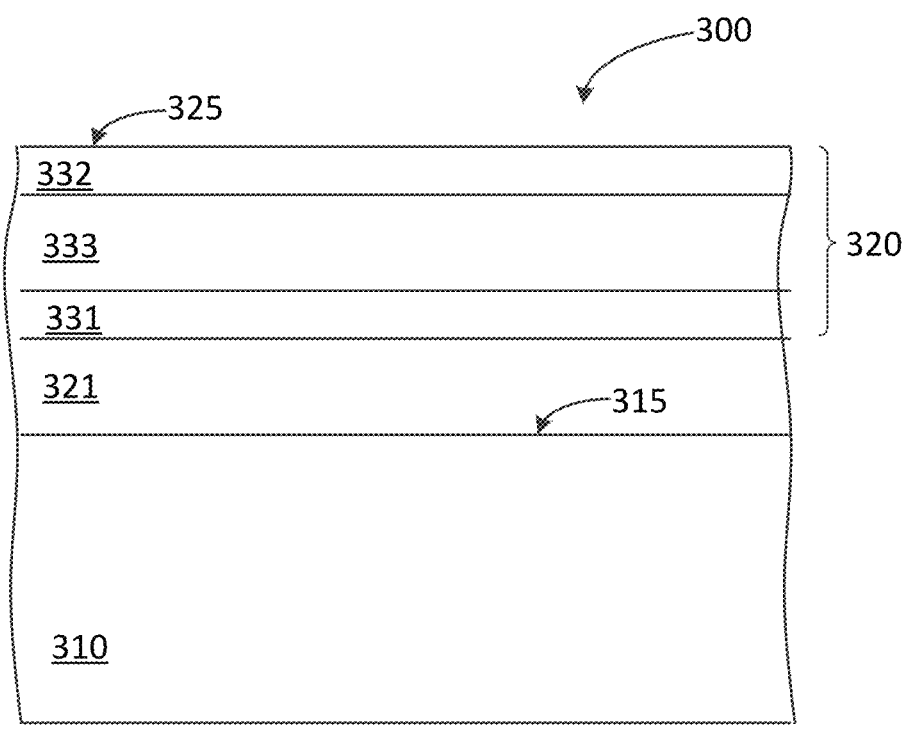
FIG. 4 is a schematic partial cross-section of a photonic chip including a vertical layer stack of an RF delay line according to an embodiment.

Referring now to FIG. 4, the vertical stack 320 may be a part of a chip 300, which may include a substrate 310 having a planar surface 315, and a plurality of layers disposed over and along the planar surface 315, including the vertical stack 320. In some implementations, the chip 300 may include optical modulator segments embedded therein, such as e.g. the photonic chip 100, with the vertical stack 320 being a part of the photonic chip. In such embodiments the chip 300 may also include an optical layer or layers 321, which may include one or more optical waveguides, such as the optical waveguide 110. It will be appreciated that chip 300 may include other layers not shown in FIG. 4, e.g. below or above the layer or layers 321 and above the vertical stack 320. By way of example, the chip 300 may be a silicon-on-insulator (SOI) chip, with the layer 321 being a silicon layer that may comprise an optical core of the optical waveguide 110, with the substrate 310 including a buried oxide layer adjacent the planar surface 315 thereof. In example embodiments, the RF delay lines 135, 235 may be fabricated on the photonic chip within the so-called "back end of line" (BEOL) metal layers. In other embodiments, the vertical stack 320 may be a part of another chip or carrier, such as e.g. an RF driver chip or an RF connector substrate or carrier as described below, with the RF TL 230 connected to drive a modulator segment defined in a photonic chip, e.g. the modulator segment 130 of the photonic chip 100 illustrated in FIG. 1.

Figure 5A:
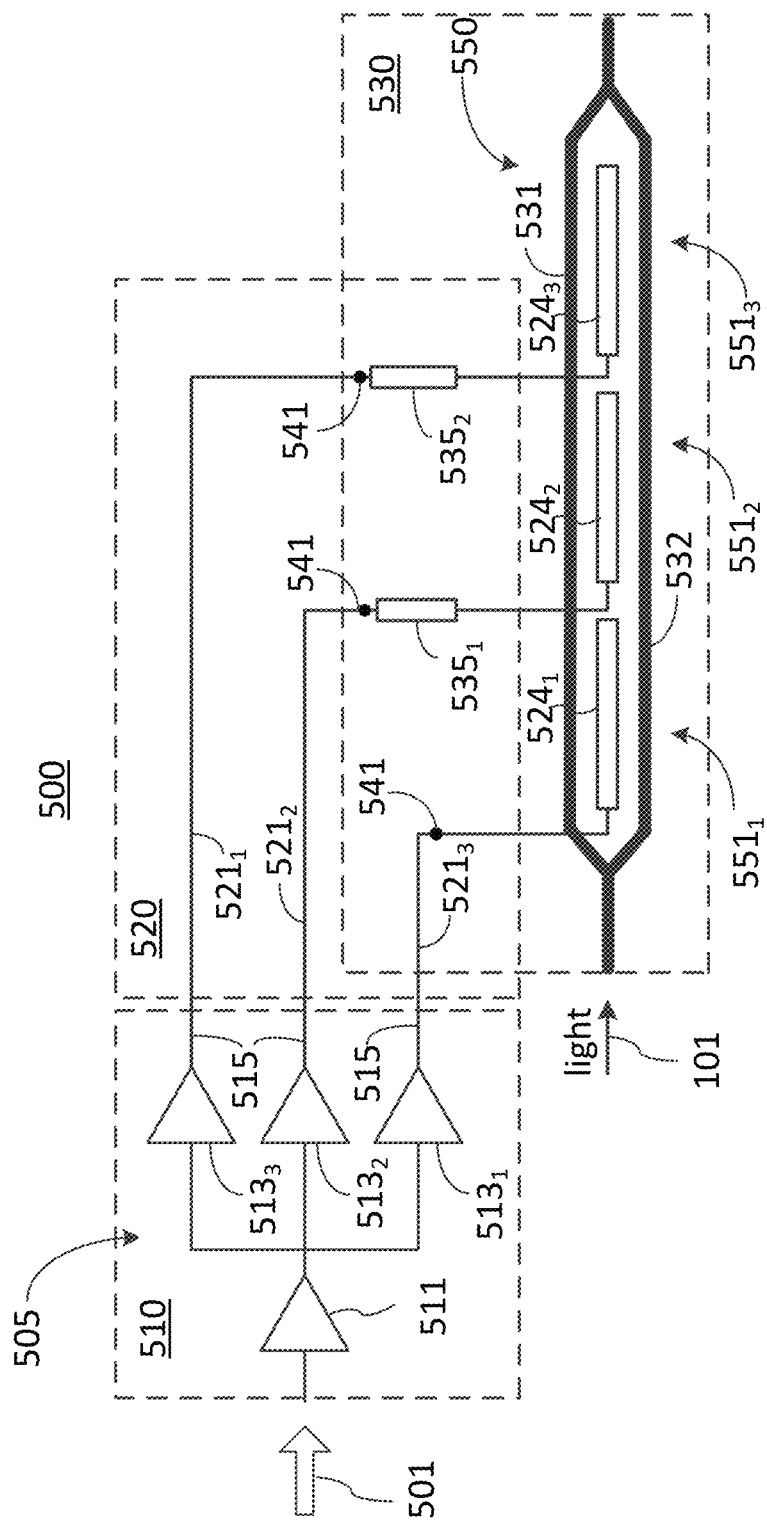
FIG. 5A is a schematic functional diagram of an example segmented optical modulator apparatus having RF delay lines with vertically-loaded TL segments located in a photonic chip.
Figure 5B:
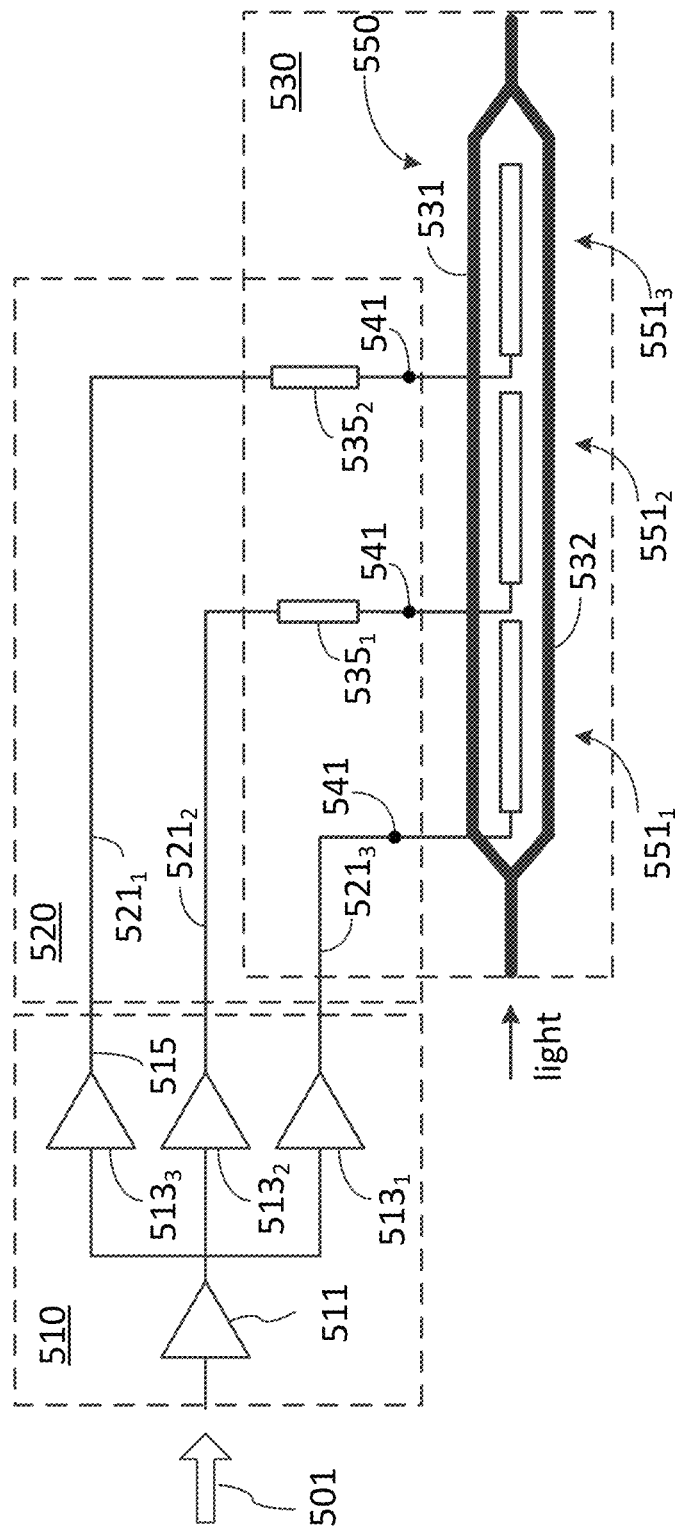
FIG. 5B is a schematic functional diagram of an example segmented optical modulator apparatus having RF delay lines with vertically-loaded TL segments in a carrier connected to the photonic chip.

FIGS. 5A and 5B illustrate example placements of RF delay lines according to the present disclosure in an example segmented optical modulator apparatus 500. The apparatus 500 includes an RF driver circuit 505 having three parallel RF outputs 515 connected to drive three optical modulator segments (OMSs) $551_1$, $551_2$, and $551_3$ of a segmented Mach-Zehnder modulator (MZM) 550, which are optically connected in series. The OMS $551_1$-$551_3$ may be generally referred to as OMSs 551i. The RF driver circuit 505 may include a common input stage 511 that in operation receives an input RF signal 501 for modulating input light 101 therewith. The input stage 511 is connected to drive three parallel output RF drivers $513_1$-$513_3$, one for each OMS 551i. The number N of the OMSs 551i in the segmented MZM 550, and the corresponding number of the output RF drivers 513i, may range from at least 2 to as many as 10 or greater. The output RF drivers $513_1$-$513_3$, which may be generally referred to as RF drivers 513i, may generate amplified portions or copies of the input RF signal 501, which are then individually delivered to respective OMSs 551i of the segmented MZM 550 over three RF TLs $521_1$-$521_3$ ("RF TLs 521i"). Each of the RF TLs 521i includes an electro-optic modulating TL segment, schematically indicated in FIGS. 5A and 5B at $524_1$, $524_2$, and $524_3$, respectively ("modulating TL segments 524i"), which extend along adjacent segments of the optical waveguide arms 531 and 532 for modulating optical properties thereof with suitably delayed and amplified portions or copies of the input RF signal 501, e.g. the effective refractive index of the segments of the optical waveguide arms 531, 532 within corresponding ones of the OMSs 551i, which may be conventional OMSs.

The second RF TL $521_2$ and the third RF TL $521_3$, which are connected to drive the second and third OMSs $551_2$ and $551_3$, respectively, include corresponding RF delay line segments $535_1$ and $535_2$. The RF delay line segments $535_1$ and $535_2$ include vertical capacitive loading of the corresponding RF TL in a vertical layer stack, as described above. The amount of capacitive loading is configured to synchronize the delivery of the amplified portions of the input RF driver signals at the respective second and third OMSs with the arrival of the same part of the input light 101 thereat.

In some embodiments, the RF driver circuit 505 may be implemented as an electrical integrated circuit (IC) in an IC driver chip 510, e.g. using CMOS or SiGe (Silicon Germanium) technology, with the segmented MZM 550 implemented as a photonic integrated circuit (PIC) in a photonic chip 530, e.g. a SiP chip. In some embodiments, the RF TLs 521i may be disposed in part in a carrier 520 that is external to the photonic chip 530, and connect to corresponding parts of the RF TLs 521i on the photonic chip 530 using suitable TL connectors 541. In some embodiments, the carrier 520, also referred to as the connector substrate 520, may be flip-chip mounted to the photonic chip 530. The connector substrate 520 may be, for example, a part of a modulator package, or a separate chip, or any medium suitable for delivering high-frequency RF signals, including but not limited to ceramics and medium built e.g. using organic High Density Build Up (HDBU) technology. In some embodiments the IC driver chip 510 may be the carrier that connects to the photonic chip 530 directly using the TL connectors 541, e.g. being flip-chip mounted thereto, in the absence of a connector chip or substrate therebetween.

In various embodiments, one or both of the RF delay lines 535$i$ may be located in the photonic chip 530, in the RF chip 510, in the connector substrate 520, or in parts in some combination thereof. FIG. 5A schematically illustrates an example embodiment where the RF delay lines $535_1$ and $535_2$ are formed in the photonic chip 530, by capacitively loading segments of the RF TLs $521_1$ and $521_2$ located in the photonic chip 530, with inter-chip TL connectors 541 located upstream thereof. FIG. 5B schematically illustrates another example embodiment where the RF delay lines $535_1$ and $535_2$ are formed in the connector substrate 520, by capacitively loading segments of the RF TLs $521_1$ and $521_2$ located in the connector substrate 520, with inter-chip TL connectors 541 located downstream thereof. Here, the terms "upstream" and "downstream" relate to the direction of propagation of the RF signal 501, or corresponding copies or portions thereof, with the output RF drivers 513$i$ of the RF driver circuit 505 being upstream of the respective OMSs 551$i$.

Figure 6:
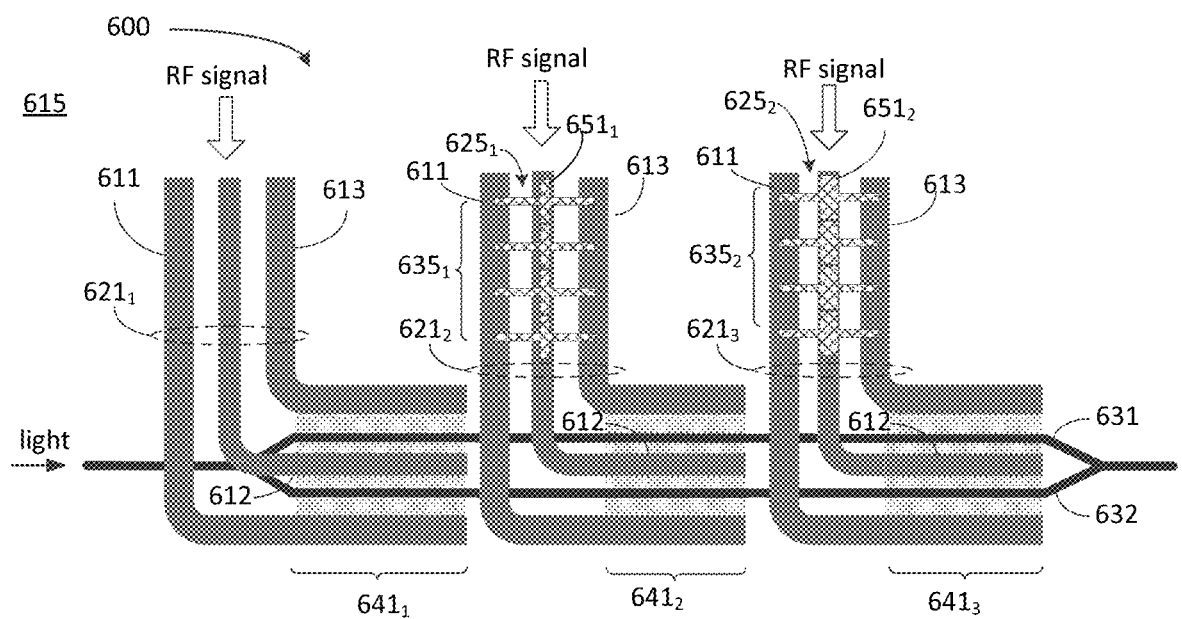
FIG. 6 is a schematic diagram illustrating a parallel array of vertically-loaded segments of RF TLs driving a TW Mach-Zehnder modulator (MZM)

FIG. 6 illustrates an example segmented MZM 600, which may be an embodiment of the segmented MZM 550, and which includes three OMSs $641_1$, $641_2$, and $641_3$ connected optically in series and separately driven by respective modulating TL segments of corresponding RF TLs $621_1$, $621_2$, and $621_3$. In this embodiment each of the RF TLs $621_1$, $621_2$, and $621_3$ is a G-S-G TL having a signal ("S") electrode 612 between two ground ("G") electrodes 611 and 613. The optical waveguide arms 631 and 632 of the segmented MZM 600, which extend along a main face 615 of a photonic chip and traverse the three OMSs 641$i$, are connected optically in parallel, and in operation are driven in a push-pull manner by the RF signals provided over the signal electrodes 612 of the corresponding RF TLs. The second RF TL $621_2$ includes a first RF delay line segment $635_1$, while the third RF TL $621_3$ includes a second RF delay line segment $635_2$, each of which may be an embodiment of the RF delay line segment 235 and implemented in a vertical layer stack such as stack 320 described above.

The first RF delay line segment $635_1$ includes a distributed metallic structure $625_1$ disposed in parts over and along a segment of the RF TL $621_2$, to provide a distributed capacitive loading thereto. The first metallic capacitive loading structure $625_1$ includes a sequence of first metallic elements $651_1$ aligned over and along adjacent segments of the signal electrode 612 of the RF TL $621_2$ in a different layer therefrom, the first metallic elements $651_1$ being electrically tied to at least one of the ground electrodes 611, 613 of the TL $621_2$ and capacitively coupled to the signal electrode 612 thereof, generally as described above with reference to FIGS. 2B-3C. The second RF delay line segment $635_2$ includes a second distributed metallic structure $625_2$ to provide a distributed capacitive loading to the underlying TL segment of the third TL $621_3$. The second metallic capacitive loading structure $625_2$ includes a sequence of second metallic elements $651_2$ aligned over and along adjacent segments of the signal electrode 612 of the third RF TL $621_3$ in a different layer therefrom, the second metallic elements $651_2$ being electrically tied to at least one of the ground electrodes of the third TL and capacitively coupled to the signal electrode thereof, also generally as described above with reference to FIGS. 2B-3C. In some embodiments, the second RF delay line segment $635_2$ may be configured to provide a different, e.g. greater, RF time delay than the first RF delay line segment $635_1$. In some embodiments the different, e.g. greater, time delay is provided by the second RF delay line segment $635_2$ having a different, e.g. greater length. In some embodiments the different, e.g. greater, time delay of the second RF delay line segment $635_2$ is provided by the second metallic elements $651_2$ having a different, e.g. greater width than the first metallic elements $651_1$, and therefore providing a greater capacitive loading to the underlying TL. In such embodiments, the first and second RF delay lines $635_1$ and $635_2$ may have about a same length along the signal electrodes of the respective TLs. The capacitively-loaded segments of the signal electrodes 612 in the respective RF delay line segments $635_1$ and $635_2$ may also have different widths to appropriately modify the TL inductance such that a similar line impedance is achieved while realizing a different RF propagation velocity.

Figure 7:
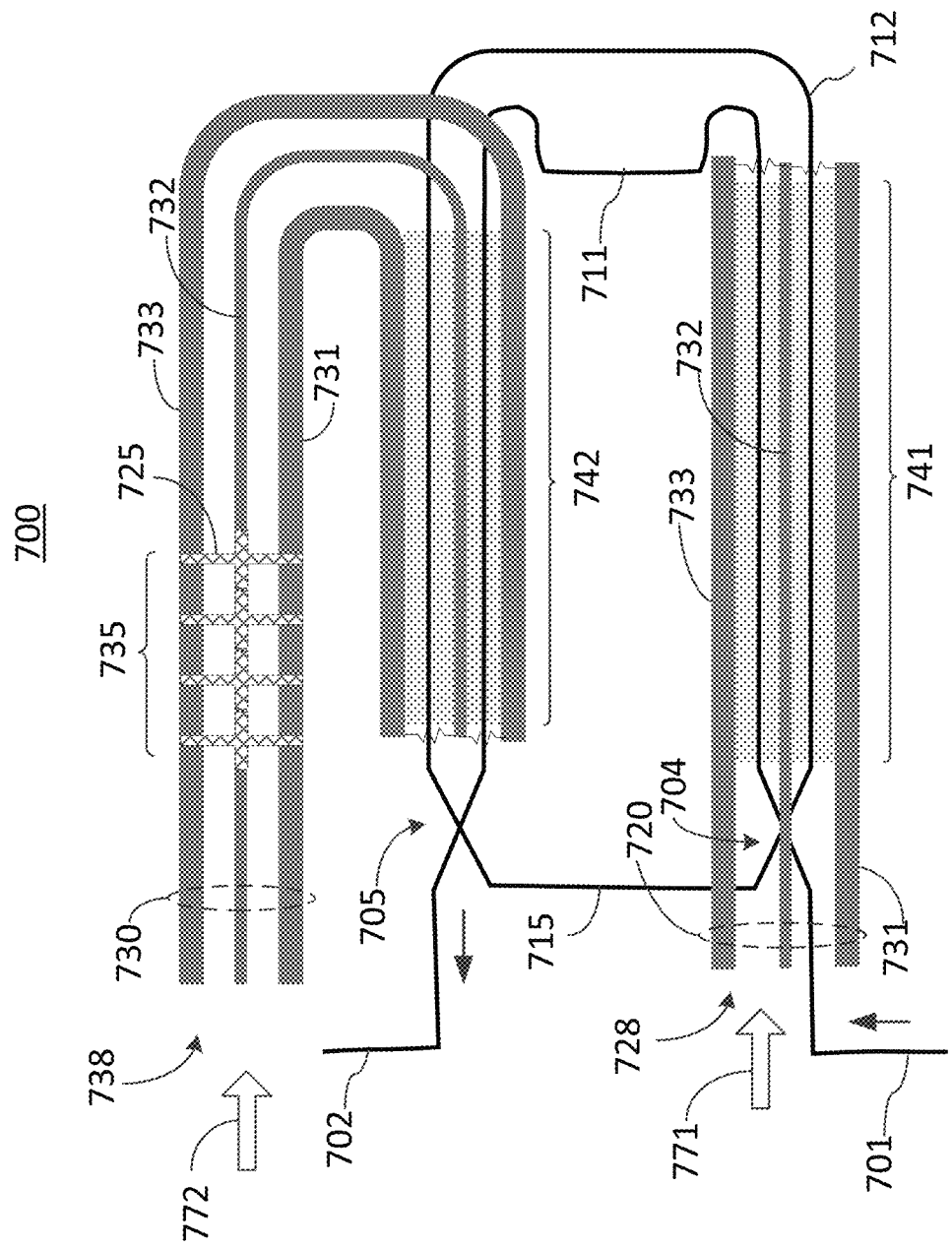
FIG. 7 is a schematic diagram illustrating a vertically-loaded segment of an RF TL driving a segment of a coupling modulated resonator.

FIG. 7 illustrates another segmented optical modulator 700, which may include one or more RF delay lines according to embodiments of the present disclosure. The segmented optical modulator 700, which may be referred to as a coupling-modulated optical resonator, includes a looped MZM formed with two optical waveguide 711, 712 connected in parallel between an input 2×2 optical coupler 704 and an output 2×2 optical coupler 705. One of the remaining two optical ports of the input optical coupler 704 connects to an input optical port 701 of the modulator 700, while one of the remaining two optical ports of the output optical coupler 704 connects to the output optical port 702 of the modulator 700. The remaining optical port of the input 2×2 coupler 705 is optically connected to the remaining optical port of the output 2×2 coupler 706, forming a ring optical resonator. Two RF TLs 730 and 720 are provided, with input ends thereof for connecting to respective RF outputs of an RF driver circuit, such as the RF outputs 515 of the RF driver circuit 505 of FIG. 5A or 5B. The RF TLs 730 and 720 each include a modulating TL segment located along corresponding adjacently extending segments of the optical waveguides 711 and 712, so as to form two OMSs 741 and 742. The first OMSs 741 and the second OMS 742 are connected optically in series and are each configured for push-pull modulation of the optical phase of light portions propagating in the optical waveguides 711 and 712, by the RF signal 771 and 772 provided to the input ends of respective RF TLs. In the illustrated example the RF TLs 720, 730 each has a G-S-G electrode structure, with a signal electrode 732 disposed between two ground electrodes 731 and 733. The second RF TL 730 is disposed to drive the second OMS 742 that is optically downstream of the first OMS 721, and incorporates an RF delay line segment 735. The RF delay line segment 735 may be an embodiment of the RF delay lines or delay line segments described above, and may include a distributed metallic structure 725 including a sequence of spaced metallic elements that are electrically tied to the ground, are disposed along adjacent segments of the signal electrode 732 in a different vertical layer therefrom, and configured to be capacitively coupled to the respective adjacent segments of the signal electrode 732, so as to provide a desired amount of capacitive loading to the adjacent, e.g. underlying, segment of the RF TL 730.

Example embodiments of segmented travelling wave and resonant optical waveguide modulators described above with reference to FIGS. 2A-7 employed RF TLs having a G-S-G electrode structure, with an optical waveguide disposed between a ground electrode and a signal electrode, and/or a signal electrode disposed between parallel segments of two optical waveguides for push-pull modulation of the effective refractive indices thereof. In other embodiments, segmented optical waveguide modulators, e.g. of the types described above, may include differentially driven OMSs and utilize RF TLs having two signal electrodes for transmitting differential RF signals. For example, travelling wave and resonant segmented optical modulators that include an MZM may use two different RF TLs, for example two G-S-G TLs as illustrated in FIGS. 2A-2C, to separately drive parallel segments of the optical waveguide arms of an MZM, e.g. with single-ended components of a differential RF drive signal, to achieve the push-pull modulation with a lower peak-to-peak voltage swing. In other embodiments, each waveguide arm of an MZM may be differentially driven by an RF TL having two signal electrodes sandwiching a segment of the optical waveguide arm. In such embodiments, each of the two RF TLs may include a vertically capacitively loaded TL segment forming an RF delay line segment, each of which may be configured generally as described above using suitably adapted distributed metallic structures that are vertically capacitively coupled to adjacent segments of the one or more signal electrodes.

Figure 8A:
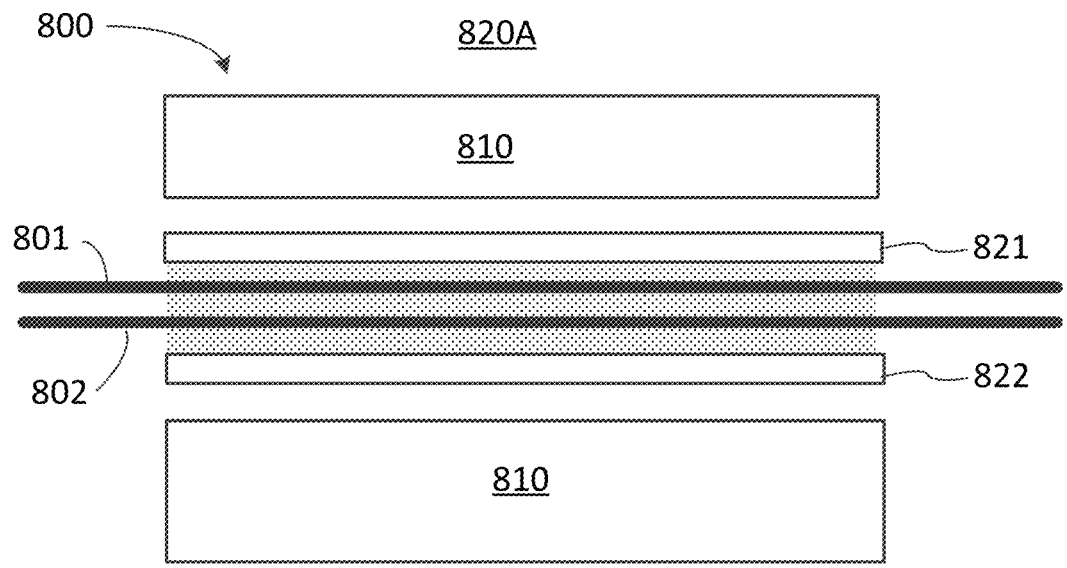
FIG. 8A is a schematic top view of a G-S-S-G RF TL disposed to drive parallel segments of two optical waveguide arms of a segmented optical waveguide modulator.

FIG. 8A schematically illustrates an example OMS 820A that includes segments of two optical waveguides 801 and 802 extending in parallel along and between two signal electrodes 821, 822 of a RF TL 800, which may also include two ground electrodes 810 extending along opposite sides of the signal electrodes 821, 822 ("G-S-S-G TL"). Each of the segments of the optical waveguides 801, 802 between the signal electrodes 821, 822 may have an optical property, e.g. an effective refractive index of the waveguide, that is electrically controlled by RF signals propagating along the signal electrodes 821 and 822. In an example embodiment, each of the optical waveguides 801 and 802 may be a silicon waveguide having a p/n junction in the segment thereof within the OMS 820A, with the two signal electrodes 821, 822 being in electrical contact with the p-doped or n-doped regions of the corresponding p/n junctions, to electrically push-pull modulate the free carrier concentration in the waveguide segments therebetween. In other embodiments, the optical waveguides 801, 802 may be made with an electro-optical material, such as but not exclusively Lithium Niobate (LiNbO3). The optical waveguides 801 and 802 may be, for example, two optical arms of an MZM, and the segments thereof between the signal electrodes 821, 822 may be push-pull driven by a differential RF signal propagating along the RF TL 800. In some embodiments, the RF TL 800 may include a third ground electrode between the signal electrodes 821 and 822.

Figure 8B:
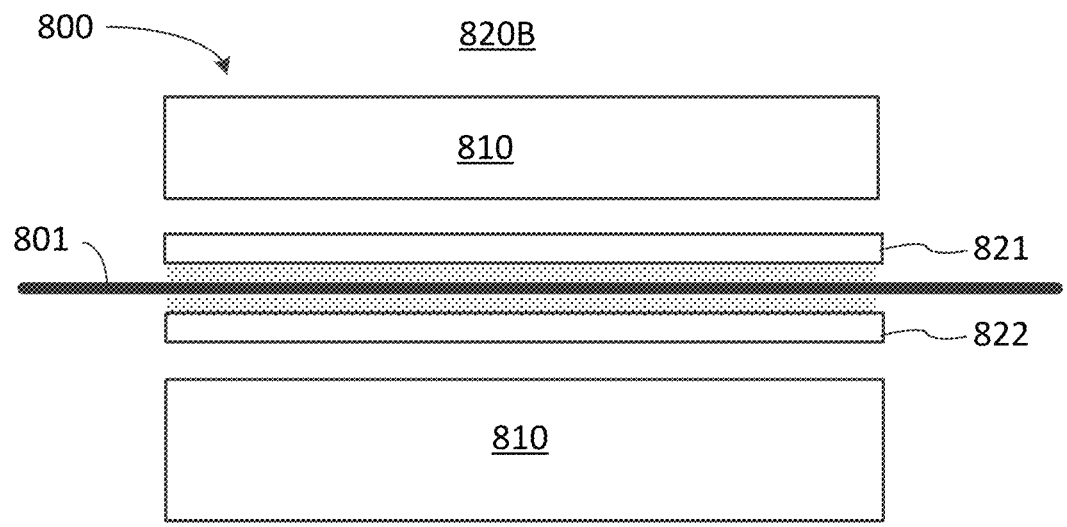
FIG. 8B is a schematic top view of a G-S-S-G RF TL disposed to drive a segment of an optical waveguide of a segmented optical waveguide modulator.

FIG. 8B schematically illustrates an example OMS 820B, which may be a variation of OMS 800B wherein the G-S-S-G RF TL 800 is used to individually drive a segment of the optical waveguide 801. In an example embodiment, the optical waveguide 801 may be made with an electro-optical material, such as but not exclusively Lithium Niobate (LiNbO3). In this embodiment the optical waveguide 801 may be, for example, one optical waveguide arm of an MZM, and the segment thereof between the signal electrodes 821, 822 may be driven by a differential RF signal propagating along the RF TL 800, with the other optical waveguide arm of the MZM driven by another G-S-S-G TL.

Figure 8C:
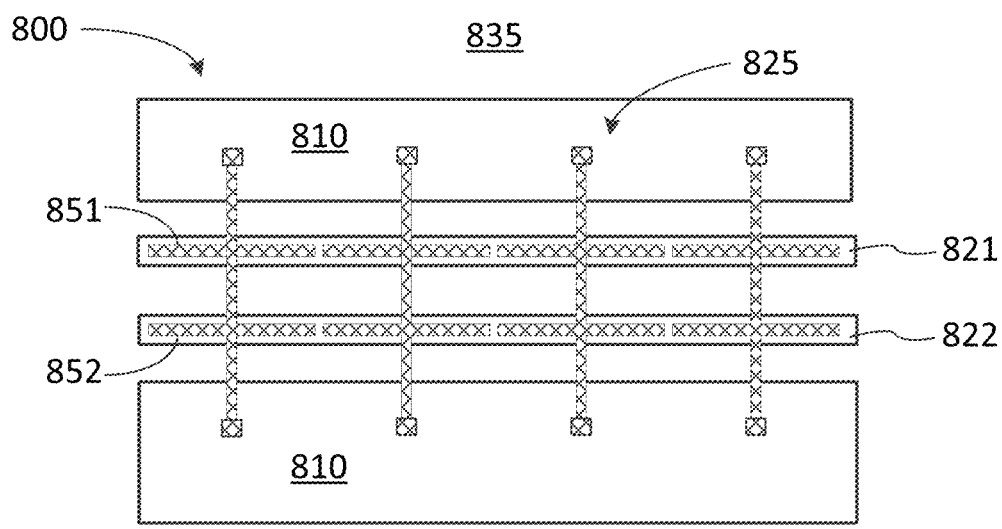
FIG. 8C is a schematic top view of a vertically-loaded RF delay segment of the G-S-S-G RF TL of FIG. 8A according to an embodiment.

FIG. 8C illustrates an example RF delay line segment 835 that may be formed with a segment of the G-S-S-G TL 800 electrically upstream of the OMS 820A or OMS 820B. In this embodiment the RF delay line segment 835 includes a distributed metallic structure 825 having two sets of spaced metallic elements, 851 and 852, disposed in a different layer than the TL, sequentially aligned along respective signal electrodes 821 and 822, and electrically tied to at least one of the ground electrodes 810, e.g. generally as described above with reference to FIGS. 2A-3B and the spaced metallic elements 251.

Figure 9:
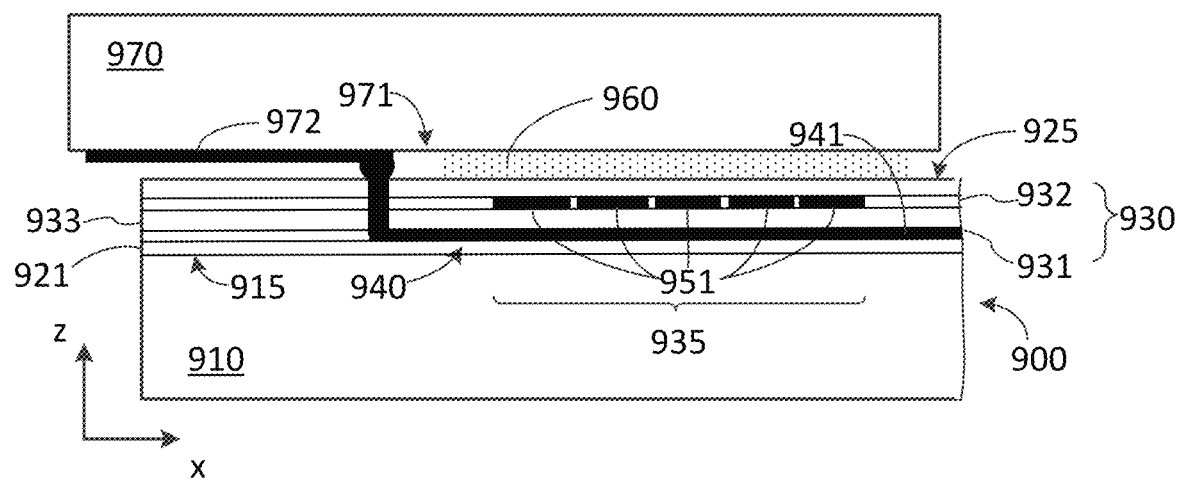
FIG. 9 is a schematic cross-sectional view of a photonic chip flip-chip mounted to a carrier, with RF delay lines based on a vertically-loaded TLs in the photonic chip.
Figure 10:
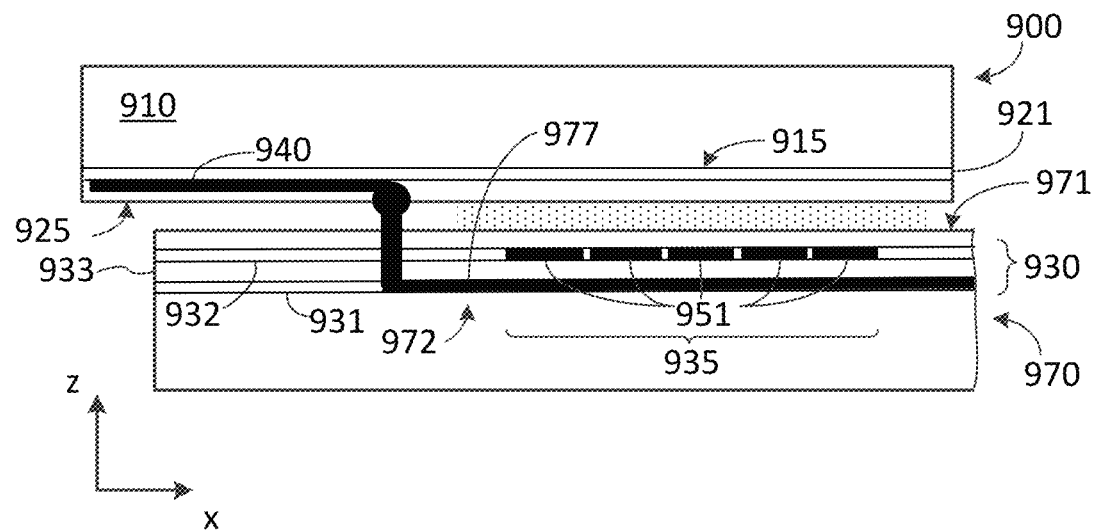
FIG. 10 is a schematic cross-sectional view of a photonic chip flip-chip mounted to a carrier, with RF delay lines based on a vertically-loaded TLs in the carrier.

Referring now to FIGS. 9 and 10, an RF delay line segment such as the ones described above may be implemented in a same photonic chip as the optical modulator segment or in a different chip or carrier, at least, electrically connected to the photonic chip. FIGS. 9 and 10 schematically illustrate, in a cross-sectional view, two such example embodiments where a photonic chip 900 comprising a segmented optical modulator PIC (not shown) is flip-chip bonded to a carrier 970, e.g. a second chip or substrate, e.g. an RF driver chip or an RF connector chip or substrate, such as the RF driver chip 510 or the connector substrate 520 described above with reference to FIGS. 5A and 5B. In both embodiments, the photonic chip 900 includes, at least, a substrate 910 having a planar surface 915, one or more optical layers 921 disposed along the planar surface 915 and including an optical waveguide (not shown), and an RF TL 940 having a segment (not shown) extending along a segment of an optical waveguide and electro-optically coupled thereto to form an OMS (not shown), e.g. as described above with reference to FIGS. 1, 2A, and 5A-8A. The second chip or substrate 970 has a main face 971 facing the main face of the photonic chip 900 with a small gap therebetween, and includes RF TLs 972 that extend along the main face 971 of the second chip 970. Each RF TL 972 connects to the corresponding RF TL 940 of the photonic chip using a suitable inter-chip TL connector, which may include, e.g. one or more solder bumps. The RF TLs 940 and 972 include each at least one signal electrode and at least one ground electrode extending therealong (not shown), and may have a same G-S, G-S-G, or G-S-S-G electrode structure, among others. The RF TLs 972 and 940 may be viewed as different segments of a same RF TL extending across two or more different chips and/or substrates.

Both embodiments further include a vertical layer stack 930 comprising RF delay line segment(s) 935 electrically connected to the corresponding OMSes (not shown) via the RF TLs 940 and 972. Each RF delay line segment 935 may be an embodiment of the RF delay lines or RF delay line segments described above, with the spaced metallic elements 951 vertically capacitively coupled to a signal electrode segment of a corresponding RF TL and embodying the corresponding spaced metallic elements of the RF delay lines described above.

In FIG. 9, the vertical layer stack 930 is disposed in the photonic chip 900 along a main face 925 thereof, and includes the RF TLs 940, or at least segments thereof, in a first layer 931 of the stack and sequences of spaced metallic elements 951 in a second layer 932 of the stack, which is separated from the first layer by an intermediate non-metallic electrical insulator layer 933. The spaced metallic elements 951 are capacitively coupled to underlying segments of the signal electrodes 941 of the RF TLs 940, to form the RF delay line segments 935, and may be electrically tied, i.e. DC coupled, to the ground electrode(s) as described above. The spaced metallic elements 951 may be formed, e.g. within the back end of line (BEOL) metal layers of the photonic chip.

In the embodiment of FIG. 10, the vertical layer stack 930 is in the second chip or carrier 970 along a main face 971 thereof, and includes the RF TLs 972, or at least segments thereof, in the first layer 931, and the sequences of spaced metallic elements 951 in the second, separate layer 932 of the stack. The spaced metallic elements 951 are capacitively coupled to underlying segments of the signal electrodes 977 of the RF TLs 972 to form lumped-element capacitors therewith, which may be e.g. periodically spaced along the TLs, to provide the RF delay line segments 935. The spaced metallic elements 951 may be electrically tied to the ground electrode(s) of the RF TL 972, as described above.

In the illustrated embodiment, the spaced metallic elements 951 and portions of the ground connectors associated therewith (not shown) are disposed closer to the main face of the corresponding chip than the signal electrode segment of the RF TL to which they are capacitively coupled; they may be fabricated, e.g. in a higher BEOL layer than the TL electrodes. In other embodiments, the spaced metallic elements 951 may be in the first layer 931 of the vertical stack 930, with the signal electrode 941 of the TL 940 or 972 positioned in the second layer 932 that is closer to the main face 925 of the photonic chip 900 and/or the main face 971 of the second chip 970. By implementing the capacitive loading in a higher metal layer than that of the RF electrode, i.e. closer to the main face 925 of the chip, as illustrated in FIGS. 9 and 10, the capacitive loading structures may at least partially shield the underlying segment of the RF TLs 940 or 972 from possible environmental influences from above the main face of the corresponding chip 900 or 970. For example, if the gap between the chips 900 and 970 above the RF delay line segment 935 is non-uniformly filled with an underfill material 960, the RF propagation speed along the RF delay line segment, and the overall RF delay it provides, may be impacted by packaging variations, e.g., variable underfill placement near an edge of the photonic chip. Having the metallic capacitive loading structures in a higher metal layer than the RF electrodes, i.e. between the RF TL electrodes and the main face of the chip, may result in a device design that is more robust to packaging variations.

Figure 11:
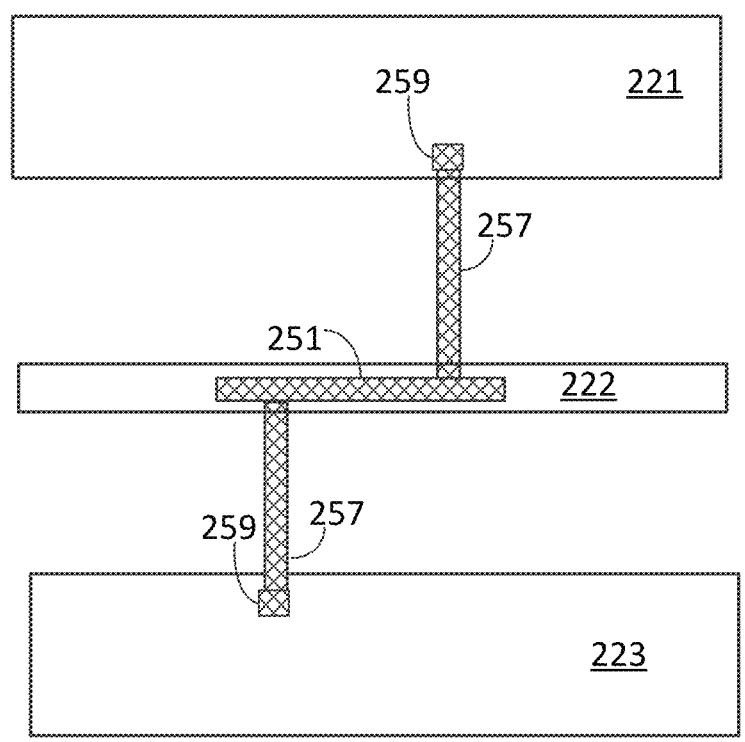
FIG. 11 is a schematic diagram illustrating an example capacitive loading element with offset ground connectors.

The examples of segmented optical modulators and RF delay lines connected thereto described above are not intended to be limiting, and many variations will become apparent to a skilled reader having the benefit of the present disclosure. For example, the concrete shape of the spaced metallic elements 251, 651, 851, 951 that provide the desired capacitive loading to the underlying signal electrode(s) of a TL may vary, and may generally differ from a rectangular stripe. Similarly, their connections 257, 259 to the ground electrode(s) may be differently arranged, for example using offset transverse metallic segments as illustrated in FIG. 11. Furthermore, embodiments may be envisioned where some of metal element 251, 651, 851, 852 are electrically tied to only one ground electrode of the corresponding RF TL.

Furthermore, various features described above with reference to a specific embodiment or embodiments may be combined with other embodiments.

Furthermore, multi-segment EOMs such as those described above may be implemented in material systems other than those based on silicon, and may use electro-optical effects other than those based on free carrier injection or depletion. Non-limiting example of materials and material systems that may be used to implement one or more modulator segments of an EOM include photonic-crystals, integrated graphene layers, various compound semiconductor materials such as those of the III-V group, or thin-film LiNbO3 integrated on a suitable, e.g. silicon, substrate.

Furthermore in the description above, for purposes of explanation and not limitation, specific details are set forth such as particular architectures, interfaces, techniques, etc. in order to provide a thorough understanding of the present inventions. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future.

While the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. An apparatus, comprising:
   a photonic chip having a planar top face and comprising a segmented optical modulator having a plurality of optical waveguide modulation segments, the optical waveguide modulation segments being located along the top face and being optically connected in series; and
   a vertical stack, at least, including:
      a first layer comprising a plurality of separate metallic radio frequency (RF) transmission lines therein, the plurality of separate metallic RF transmission lines being electrically connected in parallel such that each one of the plurality of separate metallic RF transmission lines carries a separate copy of an RF input signal with each separate metallic RF transmission line being connected to a separate, corresponding one of the plurality of optical waveguide modulation segments such that each separate metallic RF transmission line drives only the separate, corresponding one of the plurality of optical waveguide modulation segments to which it is connected;
      a second layer extending along and separate from the first layer and comprising at least two separate distributed metallic structures therein, each one of the at least two distributed metallic structures being capacitively coupled to an adjacent one of the plurality of separate metallic RF transmission lines to set a propagation time delay for the input RF signal carried by the capacitively coupled metallic RF transmission line, such that each one of the at least two distributed metallic structures only affects the propagation time delay of the input RF signal driving the corresponding one of the optical waveguide modulation segments to which the capacitively coupled metallic RF transmission line is connected; and
      an electrical insulating layer located between the first and second layers.

2. The apparatus of claim 1 further comprising an RF driver circuit having an array of parallel RF outputs, each of the RF outputs being electrically connected to a corresponding one of the separate metallic RF transmission lines.

3. The apparatus of claim 2, wherein the at least two separate distributed metallic structures are configured such that the propagation time delays of the input RF signal to corresponding ones of the optical waveguide modulation segments differ from each other.

4. The apparatus of claim 1, wherein the vertical stack is flip-chip bonded to the photonic chip.

5. The apparatus of claim 1, wherein the second layer of the vertical stack is located farther from the planar top face than the first layer.

6. The apparatus of claim 1 wherein each of the separate metallic RF transmission lines comprises a signal electrode and at least one ground electrode; and wherein each of the at least two separate distributed metallic structures is connected by metallic connectors to the at least one ground electrode of one of the separate metallic RF transmission lines to which said separate distributed metallic structure is capacitively coupled.

7. The apparatus of claim 6, wherein each of the at least two of the separate distributed metallic structures comprises first metallic segments aligned along an adjacent segment of the signal electrode of a corresponding one of the separate metallic RF transmission lines to which said separate distributed metallic structure is capacitively coupled and located between said signal electrode and the top face of the photonic chip, at least partially shielding the adjacent segment of the signal electrode from environment above the main face of the photonic chip.

8. The apparatus of claim 7 wherein at least some of the first metallic segments have linear dimensions smaller than or equal to one quarter of a wavelength of an RF signal propagating along one of the separate metallic RF transmission lines with a frequency of a baud rate of the RF driver circuit.

9. The apparatus of claim 8 wherein the at least some of the first metallic segments have each a length along the adjacent segment of the signal electrode that is smaller than one quarter of a wavelength of an RF signal propagating along one of the separate metallic RF transmission lines and having a frequency of a baud rate of the RF driver circuit.

10. The apparatus of claim 8 wherein each of the metallic connectors comprises a metallic segment extending transverse to the adjacent segment of the signal electrode and is physically connected by a metal portion traversing the electrical insulating layer to the at least one ground electrode of the one of the of the separate metallic RF transmission lines.

11. The apparatus of claim 8 wherein one of the at least two separate distributed metallic structures have segments of a first width along an adjacent segment of the signal electrode of one of the separate metallic RF transmission lines and another of the at least two separate distributed metallic structures have segments of a different second width along an adjacent segment of the signal electrode of another of the separate metallic RF transmission lines.

12. The apparatus of claim 1 wherein the vertical stack is in the photonic chip, and wherein the second layer comprising the metallic structures is a back end of line (BEOL) metal layer of the photonic chip.

13. The apparatus of claim 12 wherein the photonic chip comprises an optical waveguide extending along the top face, wherein the separate metallic RF transmission lines comprise segments extending adjacent and along corresponding segments of the optical waveguide to form the optical waveguide modulation segments therewith.

14. The apparatus of claim 13 wherein the optical waveguide is an optical waveguide arm of a Mach-Zehnder modulator located along the top face.

15. The apparatus of claim 1 wherein the vertical stack is in a carrier external to the photonic chip.

16. The apparatus of claim 1 wherein the optical modulator comprises an optical resonator including a segmented Mach-Zehnder modulator comprising the optical waveguide modulation segments.

17. The apparatus of claim 1 wherein at least one of the separate metallic RF transmission lines comprises two ground electrodes and two signal electrodes extending between the two ground electrodes, wherein some of the separate distributed metallic structures comprise sequences of metallic segments aligned along adjacent segments of the signal electrodes and are electrically connected by metal connectors to at least one of the ground electrodes.

18. A segmented optical modulator comprising:
a photonic chip having a planar top face and comprising:
an optical modulator including two optical waveguide modulation segments located along the top face and optically connected in series;
first and second radio frequency (RF) transmission lines comprising respective signal electrodes and being connected in parallel to carry respective separate copies of an RF input signal to separately drive the two optical waveguide modulation segments therewith, the signal electrodes of the first and second RF transmission lines being physically separate from each other; and
a plurality of spaced apart and ground-connected metallic segments aligned along a segments of the signal electrode of the second RF transmission line, being capacitively coupled thereto and being located between the planar top face and the second RF transmission line to shield the segment of the second RF transmission line from environment above the planar top face of the photonic chip.

* * * * *